June 12, 1951 B. W. GAMSON 2,556,178
PRODUCTION OF CARBON DISULFIDE
Filed Aug. 17, 1948
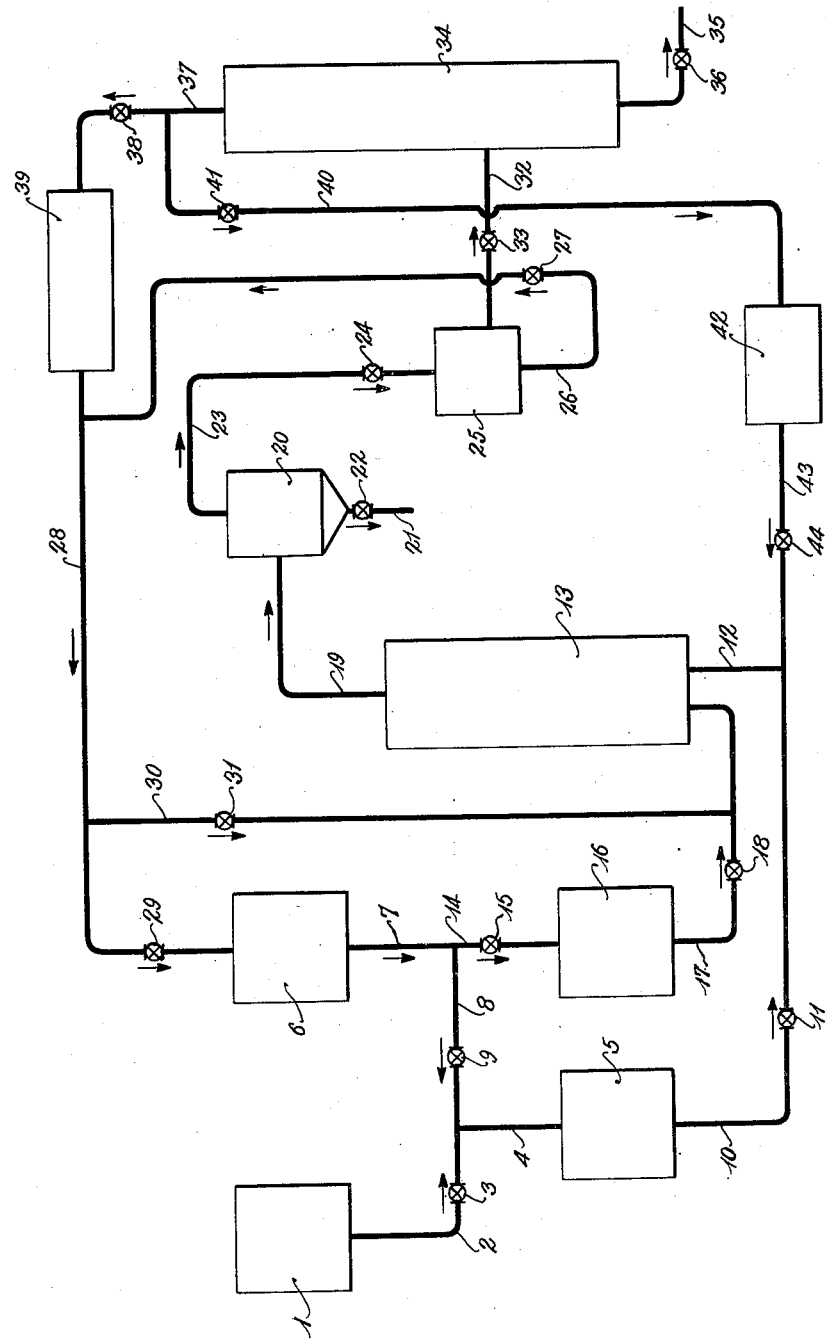
INVENTOR.
*Bernard W. Gamson*
BY *Lee J. Gary*
ATTORNEYS Patented June 12, 1951

2,556,178

UNITED STATES PATENT OFFICE 2,556,178

PRODUCTION OF CARBON DISULFIDE

Bernard W. Gamson, Morton Grove, Ill., assignor to Great Lakes Carbon Corporation, Morton Grove, Ill., a corporation of Delaware Application August 17, 1948, Serial No. 44,658

5 Claims. (Cl. 23—206)

This invention relates to a process for manufacturing carbon disulfide by treatment of a reactive form of carbonaceous compound with sulfur or hydrogen sulfide and to a process for simultaneously producing activated carbon.

The reactive carbonaceous compounds referred to herein as sulfocarbons, are of the composition and may be prepared by the method described in my copending application Ser. No. 649,730, now U. S. Patent No. 2,447,004. Briefly this method comprises forming a uniform mixture of a hydrocarbonaceous substance, liquid in the range of about 350–625° F., with elemental sulfur. The mixture may be made at normal room temperature or at an elevated temperature below about 500° F. This uniform mixture is then heated to a temperature above about 625° F., and, for the purposes of the present invention, at a temperature of about 1400–1800° F. Under these conditions the liquid mixture is converted into a solid infusible, insoluble, amorphous, black material composed of carbon hydrogen and sulfur in chemical combination, and may contain minor proportions of combined oxygen or nitrogen as well as small percentages of ash.

The term sulfocarbon as used herein is defined as having the following composition and made of the following preparation:

| | Per cent |
|---|---|
| Carbon | 70 to 93 |
| Hydrogen | 1.8–0.3 |
| Sulfur | 25 to 6 |
| Ash | Up to about 2.5 |

They have a real density of about 1.5 to 1.9. The sulfur, hydrogen and sulfur are chemically combined in the composition. They are made heating a mixture of hydrocarbons containing added elemental sulfur in proportions of at least 60% the stoichiometric equivalent of the hydrogen in said hydrocarbon to an ultimate temperature of from 1100° F. to 1800° F. The details of the mode of preparation are given in greater detail both in said patent and hereinafter.

The process is diagrammatically illustrated in the accompanying drawing of which the following is a description.

A heavy hydrocarbon is passed from supply zone 1 through line 2, valve 3 and line 4 to a reactor 5. This hydrocarbon or mixture of hydrocarbons is preferably of petroleum origin boiling above 350° F. and being liquid in the range of about 300–625° F. It preferably has a hydrogen content of about 4–12%. Hydrogen contents of the order of about 7–10% are particularly satisfactory. Heavy petroleum residues of straight-run or cracked origin, natural or cracked asphalts, straight-run asphalts, coal tar pitch, and the like may be employed. Heavy petroleum residues which have been blown with air at elevated temperatures may also be used.

Elemental sulfur may be passed from supply zone 6, through line 7, line 8 and valve 9, joining with line 4 and being mixed by any suitable method in reaction zone 5. Although shown as introduced simultaneously, the sulfur and hydrocarbon may be introduced separately. The sulfur may be in solid or liquid form and it as well as the hydrocarbon may or may not be heated. Suitable pumps or proportioning devices not shown may be used throughout the entire system.

A temperature of about 375–500° F. is maintained in mixing zone 5. This may be brought about by preheating the incoming charging material or by heating the mixing zone, using an appropriate type of vessel. The reaction zone 5 is preferably equipped with an agitator to insure the uniformity of the liquid mixture. The temperature should not exceed 625° F. and preferably is not above about 475–500° F. to prevent the mixture solidifying in the reaction zone. If heated above about 625° F., the mixture is converted to sulfohydrocarbons which are normally solid, infusible, materials having a composition as outlined in the above referred to copending application. The composition of the mixture thus introduced is based upon the hydrogen content of the hydrocarbon used. In general at least 60% of sulfur based upon the stoichiometric equivalent of hydrogen in the hydrocarbon is used. Preferably 90–110% of sulfur is employed.

The mixture is passed by appropriate pumping or other means through line 10, valve 11, line 12 into reaction zone 13. Although as shown the mixture enters the bottom of the reaction vessel, it can be introduced at any suitable point. The mixture is atomized into the zone as droplets.

The reaction zone 13 may be externally heated or heated in any suitable manner to raise the temperature into the range of about 1100–1800° F. and preferably about 1400–1600° F. This may be done in part or entirely by means of the elemental sulfur introduced from line 7, through line 14, valve 15, sulfur vaporizer 16, line 17 and valve 18. The sulfur is vaporized and may be superheated above the reaction temperature maintained in zone 13 thereby supplying the sensible heat necessary to increase the temperature of the incoming hydrocarbon-sulfur mixture through line 12 to the desired point. The velocity of the vapors within zone 13 is maintained sufficiently high to obtain a so-called fluidization of the solid particles whereby they are maintained in suspension and have the appearance of a boiling liquid. When the sulfur vapors contact the particles of the mixture introduced through line 12 it transfers heat to the particles raising their temperature to the desired reaction point. This accomplishes two purposes: (1) to convert the liquid mixture into solid sulfocarbons of the composition indicated in the above mentioned copending application and (2) the sulfur vapors react with the sulfocarbons in such a way so as to convert the carbon contained therein into carbon disulfide.

The first reaction results in the evolution of hydrogen sulfide due to the dehydrogenating action of the sulfur in the liquid mixture on the hydrocarbons.

Conversion of the carbon within this zone to carbon disulfide may be substantially 100% complete or, if desired, it is possible simultaneously to produce a highly active form of carbon.

In order to produce complete conversion to carbon disulfide, the vapor velocity is maintained at such a point that little or none of the carbon is swept out of the reaction zone. If it is desired to produce activated carbon as well, a higher vapor velocity is used, this being based upon the desired rate of removal of activated carbon and the degree of activity desired. The sulfocarbon as produced is inactive for liquid or gas absorption purposes, but when part of the carbon is consumed the residue is highly active for purposes for which commercial activated carbon is used.

The vapor mixture from zone 13, which may contain some ash in finely divided form or may contain activated carbon if this is being produced, passes through line 19 to separator 20 which may be of the cyclone type. The ash and/or activated carbon is withdrawn through line 21, containing valve 22. The vapors comprising hydrogen sulfide, carbon disulfide and unconverted sulfur pass through line 23 and valve 24 to a cooler or condenser 25. The sulfur is condensed and may be withdrawn through line 26 and valve 27 joining with line 28, passing through line 29 to sulfur storage 6. Alternatively a part or all of the sulfur may be passed through line 30 and valve 31 joining with line 17 and thus returned to the reaction zone. The temperature in condenser 25 is maintained at a point at which the sulfur is liquid but is not in the highly viscous form.

The uncondensed vapors pass through line 32 and valve 33 to fractionator 34. The carbon disulfide is removed through line 35 and valve 36 to storage. The vapors consisting essentially of hydrogen sulfide may be passed through line 37, valve 38 to a sulfur recovery system 39 in which the hydrogen sulfide may be oxidized by known means in the presence or absence of a catalyst, into elemental sulfur. This is then returned through line 28 and may be passed to either the sulfur storage 6 or recycled to zone 13 as previously described.

According to one preferred operation a part or all of the hydrogen sulfide may be passed through line 40, valve 41, a preheater 42, line 43 and valve 44 and thence through line 12 to reactor 13. When this is done a temperature preferably of 1400–1800° F. is maintained in the reaction zone. The hydrogen sulfide reacts with the carbon in the sulfocarbon to produce carbon disulfide and hydrogen. The hydrogen sulfide formed in the process may thus replace a part or all of the sulfur added through line 17 in which case the end products are principally hydrogen and carbon disulfide.

Since hydrogen is built up during the course of this reaction and must be removed, two courses are open. In one case the hydrogen sulfide may be absorbed by known means, and the hydrogen separated and vented from the system. The hydrogen sulfide is recovered and recycled. Means for doing this are known, for example by the use of various absorptive methods and the step is not illustrated.

Alternatively a part of the hydrogen sulfide-containing gas may be recycled through line 40 as described and the remainder passed through the sulfur recovery system 39 in which event the hydrogen is burned and the hydrogen sulfide is converted to elemental sulfur, the sulfur being condensed, separated from the gaseous combustion products and returned through line 28 to zone 6.

When operating according to the above described method, the carbon contained in a Mid-Continent cracked fuel oil can be converted substantially completely to carbon disulfide using a temperature of about 1400° F. in the reaction zone. Alternatively from 10 to 70% of the sulfocarbon can be recovered from separator 20 as a highly active carbon which may be of equal or better activity than commercial activated carbons. The uses for this activated carbon include gas absorption, decolorizing of chemical solutions, decolorizing oils, or sugar solutions, and many other purposes for which activated carbon can be employed.

I claim as my invention:

1. A process for producing carbon disulfide which comprises forming a uniform liquid mixture of elemental sulfur and a heavy hydrocarbonaceous material, the proportion of said sulfur being at least 60% of the stoichiometric equivalent of the hydrogen content of said material, said mixture being liquid in the range of about 300° to 625° F., passing the mixture in the form of discrete liquid particles into a reaction zone maintained at a temperature of about 1100° to 1800° F., thereby converting them to solid particles of sulfo-carbon and hydrogen sulfide, passing vapors of elemental sulfur into said reaction zone, maintaining the vapor velocity in said reaction zone at a point adequate to maintain the solid particles of sulfo-carbon in fluidized condition, thereby reacting the carbon in said particles with said sulfur to form carbon disulfide, removing vapors from said zone, separating suspended solids from the vapors, cooling the vapors to condense unreacted elemental sulfur in liquid form, separating the condensed sulfur from the uncondensed vapors and recycling it, fractionating the last mentioned vapors to recover carbon disulfide and recycling at least a portion of the hydrogen sulfide gas from the fractionating step to said reaction zone.

2. The process of claim 1 wherein a portion of said hydrogen sulfide is oxidized to elemental sulfur and the elemental sulfur returned to the reaction zone.

3. A process for producing a carbon disulfide which comprises forming a uniform liquid mixture of elemental sulfur and a heavy hydrocarbonaceous material, the proportion of said sulfur being at least 60% of the stoichiometric equivalent of the hydrogen content of said material, said mixture being liquid in the range of about 300° to 625° F., passing the mixture in the form of discrete liquid particles into a reaction zone maintained at a temperature of about 1100° to 1800° F., thereby converting them to solid particles of sulfo-carbon and hydrogen sulfide, passing vapors of elemental sulfur into said reaction zone, maintaining the vapor velocity in said reaction zone at a point adequate to maintain the solid particles of sulfo-carbon in fluidized condition, thereby reacting the carbon in said particles with said sulfur to form carbon disulfide, removing vapors from said zone, separating suspended solids from the vapors, cooling the vapors to condense unreacted elemental sulfur in liquid form, separating the condensed sulfur from the uncondensed vapors and recycling it, fractionating the last mentioned vapors to recover carbon disulfide and converting said hydrogen sulfide into elemental sulfur and returning the elemental sulfur to the process.

4. A process for producing carbon disulfide which comprises forming a uniform liquid mixture of elemental sulfur and a heavy hydrocarbonaceous material, the proportion of said sulfur being at least 60% of the stoichiometric equivalent of the hydrogen content of said material, said mixture being liquid in the range of about 300–625° F., passing the mixture in the form of discrete liquid particles into a reaction zone maintained at a temperature of about 1100 to 1800° F., thereby converting them to solid particles of sulfocarbon and hydrogen sulfide, passing vapors of a sulfur reactant selected from the group consisting of elemental sulfur and hydrogen sulfide into said zone, maintaining the vapor velocity in said reaction zone at a point adequate to maintain the solid particles of sulfo-carbon in fluidized condition, thereby reacting the carbon in said particles with said sulfur reactant to form carbon disulfide, removing vapors from said zone, separating suspended solids from the vapors, separating said sulfur reactant from the vapors and recycling it, and recovering carbon disulfide.

5. The process of claim 4, further characterized in that the sulfur reactant is hydrogen sulfide.

BERNARD W. GAMSON.

REFERENCES CITED

The following references are of record in the file of this patent:

UNITED STATES PATENTS

| Number | Name | Date |
| --- | --- | --- |
| 1,193,210 | Walter | Aug. 1, 1916 |
| 2,081,576 | Carter | May 25, 1937 |
| 2,092,386 | Baehr | Sept. 7, 1937 |
| 2,330,934 | Thacker | Oct. 5, 1943 |
| 2,443,854 | Ferguson | June 22, 1948 |
| 2,447,003 | Gamson | Aug. 17, 1948 |

FOREIGN PATENTS

| Number | Country | Date |
| --- | --- | --- |
| 358,249 | Great Britain | Oct. 8, 1931 |